UNITED STATES PATENT OFFICE.

GEORGE W. BANKER, OF BROOKLYN, NEW YORK.

PAINT AND PAINT COMPOUNDS.

SPECIFICATION forming part of Letters Patent No. 369,385, dated September 6, 1887.

Application filed December 9, 1886. Serial No. 221,116. (No specimens.)

*To all whom it may concern:*

Be it known that I, GEORGE W. BANKER, a citizen of the United States, and a resident of Brooklyn, in the county of Kings and State of New York, have invented certain new and useful Improvements in Paints and Paint Compounds, of which the following is a specification.

My invention relates to improvements in paints and paint compounds; and it consists in grinding the pigments with "corn-oil," so called—that is to say, the oil which may be obtained from the germs of Indian corn or maize—or mixing corn-oil with the ground pigments with or without a drier.

In the manufacture of glucose and of starch, and also in whisky distilling, the corn "germs," which are harmful in these manufactures, are separated from the other parts of the grain. I have discovered that the oil obtained from these corn germs can be used in place of linseed or other oils in the manufacture of paints, with the following improvements in the resulting product:

First. Owing to the peculiar characteristics or qualities of corn-oil, white paint made by its use, when used for inside work or in other places where the light is not strong, retains its whiteness permanently, and does not turn yellow or cream-colored, as the white paints do which are prepared by the employment of linseed-oil. This, as I believe, is owing to the fact that linseed-oil, when not exposed to strong light or sunshine, which bleeches it, turns yellowish because of oxidation; and my invention consists in the discovery that corn-oil does not turn thus yellow, but on the contrary retains its original whiteness.

Second. In making tinted colors, the tints are much more permanent when corn-oil is used than when linseed-oil is used. This is especially true in colors used for interior painting, where the gradual darkening of the linseed-oil colors, as they gradually oxidize, gradually changes delicate tints.

Third. Corn-oil more readily unites with the pulverized pigments during the grinding process and produces a more homogeneous mixture than when linseed-oil is used, and not only is this true at the time of grinding, but the mass retains its homogeneity without separation of the oil from the pigment for a practically indefinite time, and as a result of this quality the subsequent preparation of the paint for use is much more easily and perfectly effected, because there is no compacted pigment consequent on the separation of the oil and pigment, which the added turpentine or oil used for thinning the paint ordinarily has to cut or break up.

Fourth. Paints prepared with corn-oil are much smoother in application than other paints.

Fifth. They possess greater elasticity and do not either "chalk off" or "scale."

Sixth. The paints are cheaper.

The corn-oil that I refer to herein is the oil contained in the germs of Indian corn or maize, which can be obtained therefrom either by pressure or by dissolving it out from the germs with benzine or bisulphide of carbon or other solvents, its weight being about seven and three-quarter pounds to the gallon, and is at the present time known as an article of commerce.

In the preparation of my paint I proceed as in the manufacture of ordinary paint when linseed or other oils are employed. The pigments are thoroughly mixed with the corn-oil, and then ground in any suitable apparatus. The proportions of pigments and corn oil are substantially the same as those employed in making other commercial paints—that is to say, taking white lead as an example, to one hundred (100) pounds of white lead, add from eight (8) to ten (10) per cent. of the corn-oil, depending on the desired consistency of the ground product. As is well understood in this art, however, the proportions of pigment and oil will vary within widely differing degrees, depending on the particular pigment employed.

Corn-oil is one of the class of "semi-drying" oils, and therefore it is usually desirable to mix with the paint some sort of drier. The proportions of drier will depend on the kind of pigment used and the speed of drying required, as is well understood by paint-makers.

My corn-oil may be bleached, if desired, before adding to the pigment or mixing in the paint, the same as linseed-oil.

I prefer to employ the corn-oil pure, except the drier when it is used, both for grinding the pigment in and also for subsequently thinning it preparatory to use, either alone or in connection with turpentine or other material; but I do not limit myself to the use of corn-oil alone or pure, since other oils or substances may be admixed therewith, either during the grinding operation or for thinning the paint prior to use; or the pigments may be ground in other kinds of oil, and then the corn-oil be added for thinning the paint; or the pigment may be ground in corn-oil, and other oils or other oils and turpentine or its equivalent, or turpentine or its equivalent alone be used to thin the paint preparatory to use.

Having described my invention, I claim—

1. The above-described paint, composed, essentially, of corn-oil and a pigment, substantially as set forth.

2. The above-described paint, composed, essentially, of corn-oil and a drier, and a pigment, substantially as set forth.

3. The within-described paste-paint, composed of a pigment ground in corn-oil, substantially as set forth.

Signed at New York, in the county of New York and State of New York, this 29th day of November, A. D. 1886.

GEO. W. BANKER.

Witnesses:
JOHN H. IVES,
GEORGE A. VOSS.